United States Patent
Zheng (10) Patent No.: US 10,482,118 B2
(45) Date of Patent: Nov. 19, 2019

(54) DOCUMENT REPRESENTATION FOR MACHINE-LEARNING DOCUMENT CLASSIFICATION

(71) Applicant: SAP SE, Walldorf (DE)

(72) Inventor: Xin Zheng, Singapore (SG)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 15/623,071

(22) Filed: Jun. 14, 2017

(65) Prior Publication Data

US 2018/0365248 A1 Dec. 20, 2018

(51) Int. Cl.
*G06F 17/30* (2006.01)
*G06F 16/35* (2019.01)
*G06F 17/28* (2006.01)
*G06N 20/00* (2019.01)

(52) U.S. Cl.
CPC .......... *G06F 16/355* (2019.01); *G06F 16/358* (2019.01); *G06F 17/28* (2013.01); *G06N 20/00* (2019.01)

(58) Field of Classification Search
CPC ....................................................... G06F 16/00
See application file for complete search history.

(56) References Cited

U.S. PATENT DOCUMENTS

| | | | | |
|---|---|---|---|---|
| 2011/0103682 | A1* | 5/2011 | Chidlovskii | G06K 9/6284 382/159 |
| 2018/0285459 | A1* | 10/2018 | Soni | G06F 17/30867 |
| 2018/0285774 | A1* | 10/2018 | Soni | G06N 99/005 |
| 2018/0329882 | A1* | 11/2018 | Bennett | G06F 17/2775 |

* cited by examiner

*Primary Examiner* — Khanh B Pham
(74) *Attorney, Agent, or Firm* — Fish & Richardson P.C.

(57) ABSTRACT

Methods, systems, and computer-readable storage media for providing weighted vector representations of documents, with actions including receiving text data, the text data including a plurality of documents, each document including a plurality of words, processing the text data to provide a plurality of word-vectors, each word-vector being based on a respective word of the plurality of words, determining a plurality of similarity scores based on the plurality of word-vectors, each similarity score representing a degree of similarity between word-vectors, grouping words of the plurality of words into clusters based on the plurality of similarity scores, each cluster including two or more words of the plurality of words, and providing a document representation for each document in the plurality of documents, each document representation including a feature vector, each feature corresponding to a cluster.

20 Claims, 4 Drawing Sheets

DOCUMENT REPRESENTATION FOR MACHINE-LEARNING DOCUMENT CLASSIFICATION

BACKGROUND

Document classification can be generally described as classifying, or categorizing, documents into multiple classes, or categories. Example document classification can include aspect-based sentiment analysis, in which each document can reflect one or more aspects, and can be categorized to a sentiment (e.g., negative, positive). For example, a restaurant review can be provided as a document (e.g., text provided in one or more sentences), and can reflect one or more aspects of a restaurant (e.g., food, staff, ambience), and each aspect can be categorized with a sentiment (e.g., food→positive, staff→negative, ambience→positive).

Document classification can be performed using a machine-learning process, in which documents form a corpus of text that are used to train a machine-learning model. To perform such document classification, each document is processed to provide a respective document representation. An example approach for providing document representations includes the bag-of-words (BOW) model. Using the BOW model, each document (e.g., sentence) is represented as a vector, where each word is a feature of the vector. In some examples, weighting (e.g., binary, term frequency and inverse document frequency (TF-IDF)) can be applied to the respective features of the vector.

Such traditional approaches, however, have certain disadvantages. For example, new words that are not included in the underlying training data cannot be efficiently accounted for. As another example, resulting vectors can be relatively large. Consequently, a significant amount of computing resources (e.g., processors, memory) are required to determine and store the vectors.

SUMMARY

Implementations of the present disclosure include computer-implemented methods for providing document representations based on weighted pseudo-words. In some implementations, actions include receiving text data, the text data including a plurality of documents, each document including a plurality of words, processing the text data to provide a plurality of word-vectors, each word-vector being based on a respective word of the plurality of words, determining a plurality of similarity scores based on the plurality of word-vectors, each similarity score representing a degree of similarity between word-vectors, grouping words of the plurality of words into clusters based on the plurality of similarity scores, each cluster including two or more words of the plurality of words, and providing a document representation for each document in the plurality of documents, each document representation including a feature vector, each feature corresponding to a cluster. Other implementations of this aspect include corresponding systems, apparatus, and computer programs, configured to perform the actions of the methods, encoded on computer storage devices.

These and other implementations can each optionally include one or more of the following features: each feature of the document representation includes a feature value based on a weight determined for a respective cluster; the weight includes a term frequency and inverse document frequency (TF-IDF) weight; words are included in a cluster in response to determining that their respective word-vectors are sufficiently similar; each similarity score of the plurality of similarity scores is determined as a cosine similarity score between multiple word-vectors; processing the text data to provide a plurality of word-vectors includes processing at least a portion of the text data using Word2vec; and actions further include providing the document representations to a document classification system for one or more of natural language processing (NLP) and information retrieval (IR) based on the document representations.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to document representations based on weighted pseudo-words. More particularly, implementations of the present disclosure are directed to providing document representations including word clusters as vector features, and feature values provided as weights. Implementations can include actions of receiving text data, the text data including a plurality of documents, each document including a plurality of words, processing the text data to provide a plurality of word-vectors, each word-vector being based on a respective word of the plurality of words, determining a plurality of similarity scores based on the plurality of word-vectors, each similarity score representing a degree of similarity between word-vectors, grouping words of the plurality of words into clusters based on the plurality of similarity scores, each cluster including two or more words of the plurality of words, and providing a document representation for each document in the plurality of documents, each document representation including a feature vector, each feature corresponding to a cluster.

Figure 1:
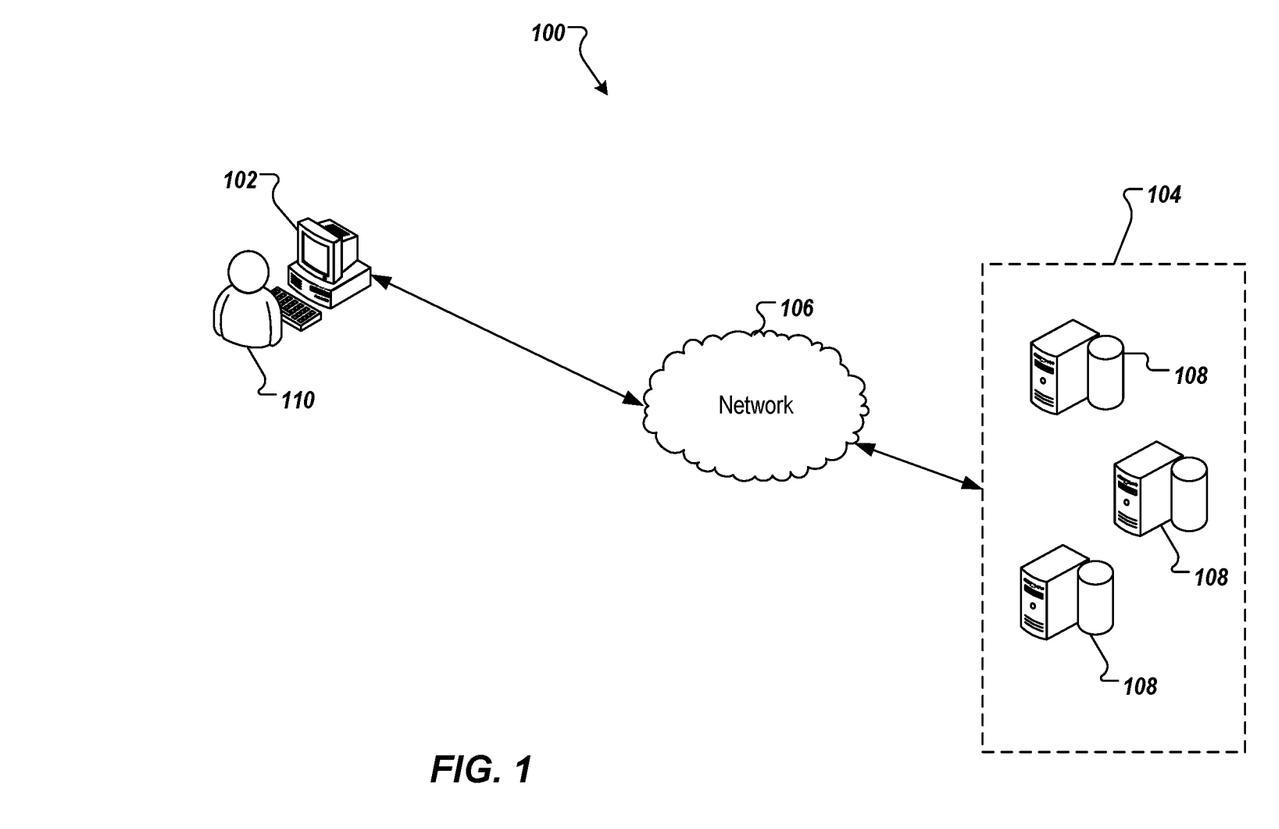
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host a refined word representation service (e.g., provided as one or more computer-executable programs executed by one or more computing devices). For example, input data can be provided to the server system (e.g., from the client device 102), and the server system can process the input data through the refined word representation service to provide result data. For example, the server system 104 can send the result data to the client device 102 over the network 106 for display to the user 110. In some examples, the result data includes refined word representations that can be used for document classification.

As introduced above, document classification can be performed using a machine-learning process, in which documents form a corpus of text that is used to train a machine-learning model. To perform such document classification, each document is processed to provide a respective document representation. An example approach for providing document representations includes the bag-of-words (BOW) model. Using the BOW model, each document (e.g., sentence) is represented as a vector, where each word is a feature of the vector.

The BOW model can be described as a simplifying representation used in natural language processing (NLP), and information retrieval (IR). Using the BOW model, a document (e.g., one or more sentence(s)) is represented as a set (bag) of the words in the document. The following example initial documents (a first initial document ($d'_1$), and a second initial document ($d'_2$)) can be considered:

$d'_1 \rightarrow$ The waiter was polite. The food was okay, but food was pricey.

$d'_2 \rightarrow$ Good atmosphere and waiter, good food menu, poor drink menu.

In some examples, the example initial documents can be filtered (e.g., to remove punctuation symbols and stop words) to provide the following example documents (a first document ($d_1$), and a second document ($d_2$)):

$d_1 \rightarrow$ waiter polite food okay food pricey $d_2 \rightarrow$ good atmosphere waiter good food menu poor drink menu Based on the above-example documents, the following example set of words (bag-of-words) can be provided, which includes all unique words of the documents:

waiter, polite, food, okay, pricey, good, atmosphere, great, menu, poor, drink

In some examples, the BOW model provides a document representation based on all distinct words of all of the documents (i.e., all distinct words in a vocabulary of all documents). Continuing with the above-example documents, example document representations can be provided as:

|       | waiter | polite | food | okay | pricey | good | atmosphere | menu | poor | drink |
|-------|--------|--------|------|------|--------|------|------------|------|------|-------|
| $d_1$ | 1      | 1      | 1    | 1    | 1      | 0    | 0          | 0    | 0    | 0     |
| $d_2$ | 1      | 0      | 1    | 0    | 0      | 1    | 1          | 1    | 1    | 1     |

Accordingly, each document representation can be described as a vector representation of the respective document, where each word is a feature of the respective document representation. In some examples, weighting (e.g., binary, term frequency and inverse document frequency (TF-IDF)) can be applied to the respective features of the vector. The example above depicts binary weighting (i.e., 1 if the word is present in the document, 0 if the word is not present in the document).

Such traditional approaches, however, have certain disadvantages. For example, new words that are not included in the underlying training data cannot be efficiently accounted for in the BOW model. As another example, documents can number in the thousands to hundreds of thousands, resulting in large vocabularies, and relatively large document representations. This is particularly problematic in the contexts of review data (e.g., restaurant reviews, movie reviews, product reviews), and social media posts, for example. In such contexts, the vocabularies can be relatively large, and include text having multiple variations, and informal format, resulting in relatively large document (feature, word) representations of each document. That is, the dimension of the document representation can be extremely large, as each feature corresponds to a unique word in the vocabulary. Consequently, a significant amount of computing resources (e.g., processors, memory) are required to determine and store the document representations.

In view of this, implementations of the present disclosure provide refined document representations based on word-vectors determined for a vocabulary (e.g., a collection of words in a set of documents). Similarities between the word-vectors are determined, and words are grouped based on similarities between respective word-vector to provide word groups (also referred to herein as pseudo-words, or clusters). Each word group includes a plurality of words. In some implementations, a weight is determined for each pseudo-word to provide a document representation for each document in the text data. In some examples, the document representations can be used to train a document classifier. Further, the document representations of the present disclosure provide for more efficient use of technical resources. For example, and as described in further detail herein, the document representations have a significantly lower dimension than provided with traditional techniques (e.g., BOW). Consequently, significantly less memory is required to store the document representations of the present disclosure, as compared to those provided from traditional techniques.

Figure 2:
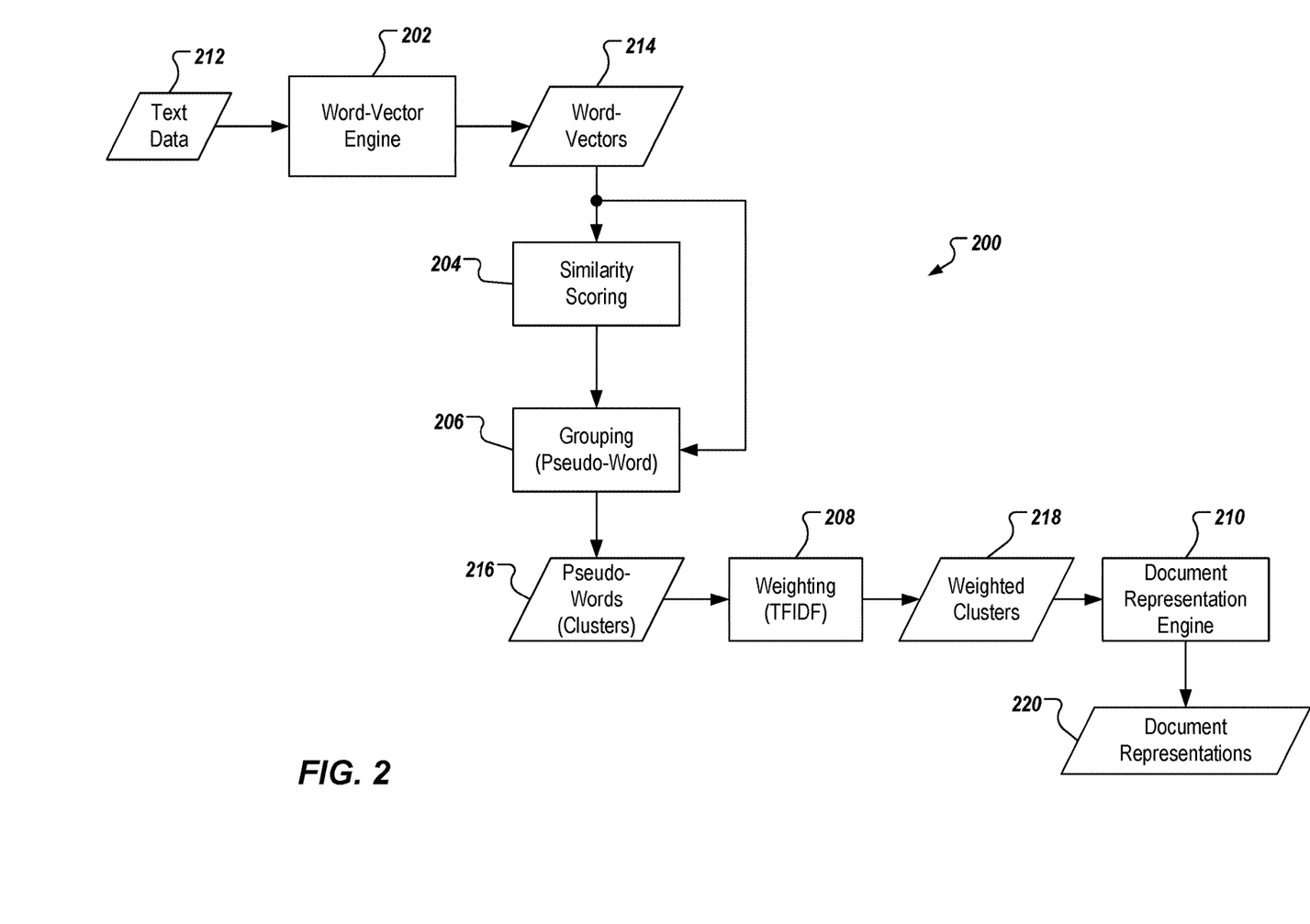
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a word-vector engine 202, a similarity scoring module 204, a grouping module 206, a weighting module 208, and a document representation engine 210. In some examples, each of the word-vector engine 202, the similarity scoring module 204, the grouping module 206, the weighting module 208, and the document representation engine 210 can be provided as one or more computer-executable programs executed using one or more computing devices (e.g., the server system 104 of FIG. 1).

In some implementations, the word-vector engine 202 receives text data 212, and processes the text data 212 to provide word-vectors 214. In some examples, the text data 212 is provided from a corpus of documents, and can be collectively referred to as a vocabulary. An example corpus of documents can include Google News, or Wikipedia. In some examples, the text data 212 is filtered to remove, for example, punctuation symbols, and stop words.

In some implementations, the word-vector engine 202 processes the text data 212 using Word2vec, which can be described as a group of related models that are used to produce word-vectors (also referred to as word embeddings). In some examples, each word-vector has multiple dimensions (e.g., hundreds of dimensions). More particularly, Word2vec can be described as an efficient implementation of the continuous bag-of-words (CBOW) model, or continuous skip-gram model for computing vector representations of words (i.e., word-vectors). In general, Word2vec takes a text corpus (the text data 212) as input, and produces the word-vectors as output by constructing a vocabulary from the text data, and learning vector representations of words. More specifically, each unique word in the text corpus is assigned a corresponding vector within a vector space. Word-vectors are positioned in the vector space such that words that share common contexts in the text corpus are located in close proximity to one another in the vector space.

Although, the vector space provided by Word2vec is continuous, the word distribution over the vector space is not continuous. This can result in, for example, similar words having word-vectors that are not close to one another within the vector space. The example words beautiful, and pretty can be considered. Although these example words have similar meanings, their respective word-vectors within the vector space might not be close to one another. Consequently, subsequent document classification using the resulting word-vectors, for example, may be less accurate than desired. Further, the word-vectors provided by Word2vec can lose information that is captured in other techniques (e.g., BOW).

In view of this, and as introduced above, implementations of the present disclosure group words based on similarity between their respective word-vectors to provide pseudo-words (also referred to as clusters herein), and apply weighting to the pseudo-words. The pseudo-words and respective weights are used to provide document representations, as described herein.

In some implementations, the similarity scoring module 204 receives the word-vectors 214, and determines similarity scores between the word-vectors 214. In some examples, a similarity score between word-vectors can be determined as a cosine similarity score. In general, the cosine similarity score is a measure of similarity between word-vectors, and is provided as a measure the cosine of the angle between the word-vectors. For example, the cosine of 0° is 1, and it is less than 1 for any other angle. Accordingly, word-vectors having the same directional orientation (0°) have a cosine similarity score of 1, word-vectors at 90° have a cosine similarity score of 0, and word-vectors diametrically opposed (180°) have a cosine similarity score of −1. In some examples, cosine similarity is used in positive space, where the cosine similarity scores are bounded in [0,1]. In such examples, word-vectors are maximally similar (e.g., are identical), if they are parallel (i.e., 0° therebetween, cosine similarity score of 1), and maximally dissimilar, if they are orthogonal (i.e., 90° therebetween, cosine similarity score of 0).

In some implementations, the grouping module 206 groups the words based on similarity scores of their respective word-vectors to provide groups (pseudo-words), referred to herein as clusters. Each cluster includes a plurality of words. Accordingly, the grouping module 206 provides pseudo-words (clusters) 216 as output. In some examples, the cosine similarity scores of word-vectors are compared to one another, and if the cosine similarity scores are determined to be sufficiently similar, the words represented by the respective word vectors are included in a cluster. In some examples, a difference is determined between the cosine similarity scores, and the difference is compared to a threshold difference. If the difference does not exceed the threshold difference, the cosine similarity scores are determined to be sufficiently similar, and the words represented by the respective word vectors are included in a cluster. For example, a cosine similarity score can be determined for each of the word-vectors representing beautiful, and pretty, respectively, and it can be determined that the cosine similarity scores are sufficiently similar. Consequently, beautiful and pretty can be included in the same cluster.

In some implementations, the pseudo-words 216 are input to the weighting module 208. The weighting module 208 provides a weight associated with each cluster. In accordance with implementations of the present disclosure, the weighting module 208 determines weights for the clusters using TF-IDF, and provides weighted clusters 218 as output. In some examples, TF-IDF can be described as a numerical statistic that conveys a relative importance of a word to a document in a collection of documents. In implementations of the present disclosure, TF-IDF conveys a relative importance of a pseudo-word based on its constituent words. In general, the TF-IDF value increases proportionally to the number of times a word appears in the document, but is offset by the frequency of the word in the corpus. In this manner, adjustment is made for words that appear more frequently. Implementations of the present disclosure include the following example relationships for term frequency (TF), inverse document frequency (IDF), and TF-IDF:

$$TF = 1 + \log(f_{c,d})$$
$$IDF = \log\left(1 + \frac{N}{n_c}\right)$$
$$TF - IDF = TF \times IDF$$

Implementations further provide the following example relationships:

$$f_{c,d} = \Sigma_{w \in c} f_w$$

$$n_c = \Sigma_{w \in c} n_w$$

where d is a document, w is each word in the text data, c is a cluster (pseudo-word), $f_w$ is the frequency of the word w, $n_w$ is the document frequency of the word w, and N is the total number of documents in the text data.

The document representation engine 210 receives the weighted clusters 218, and provides document representations for each document of the text data 212 based thereon. In some examples, each document representation is provided as a feature vector as similarly described above with reference to the BOW model. In the context of the present disclosure, the document representations could be described as being based on a bag-of-clusters (BOC) model, because each feature is provided as a cluster. In some examples, the dimension of the feature vector is equal to the number of clusters. In this manner, the dimension of the feature vector is significantly smaller than a dimension equal to the number of unique words in the text data, as described above with reference to the traditional BOW model. Below is an example document representation (feature vector), $d_{EX}$, in accordance with implementations of the present disclosure:

|  | $c_1$ | $c_2$ | $c_3$ | $c_4$ | $c_5$ | ... | $c_q$ |
|---|---|---|---|---|---|---|---|
| $d_{EX}$ | $W_{TF\text{-}IDF,c_1}$ | 0 | 0 | $W_{TF\text{-}IDF,c_4}$ | 0 | ... | 0 |

In this example, the features of the vectors are the clusters that include words of the document in question, and the values are the respective TF-IDF weights. The number of dimensions is q (i.e., the number of clusters). If, however, all of the words of the document are not in a particular cluster, the value of that cluster is set equal to 0. In the depicted example, $c_1$ and $c_4$ include words of the document in question, hence include weight values, while $c_2$, $c_3$, $c_5$, and $c_q$ do not include words of the document in question, hence include values of 0.

Figure 3:
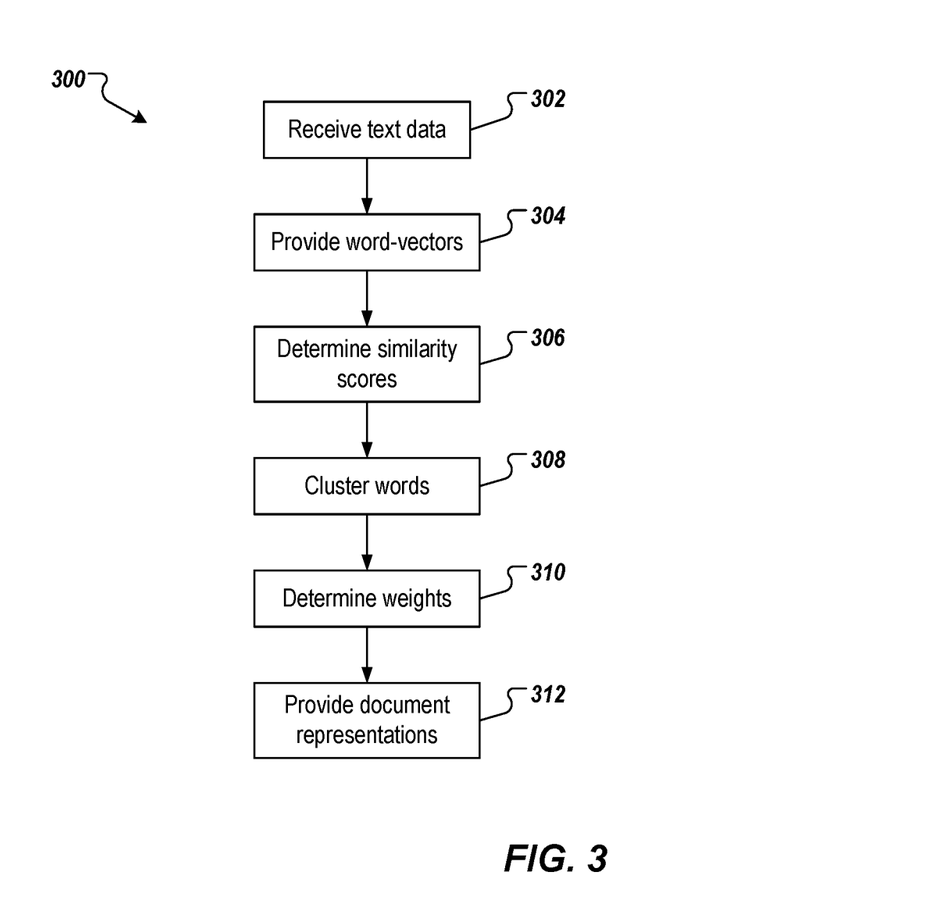
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices.

Text data is received (302). For example, and with reference to FIG. 2, the word-vector engine 202 receives text data 212. In some examples, the text data is provided as a plurality of documents, and can be refined/filtered to provide a vocabulary. Word-vectors are provided (304). For example, the word-vector engine 202 processes the text data 212 (e.g., using Word2vec, as described herein) to provide the word-vectors 214. Similarity scores are determined (306). For example, the similarity scoring module 204 receives the word-vectors 214, and determines similarity scores between the word-vectors 214 (e.g., as cosine similarity scores). Words are clustered (308). For example, unique words of the vocabulary are clustered into groups based on similarity scores of their respective word-vectors. In some examples, the grouping module 206 groups the words based on similarity scores of their respective word-vectors to provide groups (pseudo-words, clusters). Weights for the clusters are determined (310). For example, the pseudo-words 216 are input to the weighting module 208, which provides a weight associated with each cluster, as described herein. Document representations are provided (312). For example, the document representation engine 210 receives the weighted clusters 218, and provides document representations for each document of the text data 212 based thereon.

Implementations of the present disclosure provide one or more of the following example advantages. For example, implementations of the present disclosure requires much smaller representation space as compared to the efficient, traditional BOW method. Consequently, any following processes based on the document representation vector could be much faster reducing memory consumption and processor load. As another example, the implementations of the present disclosure can account for newly appearing words by leveraging Word2vec, which new words cannot be processed by the BOW method. As another example, implementations of the present disclosure combine advantages of both BOW and Word2vec. Although Word2vec also does not take relatively large representation space, when transforming discrete words to continuous representations, important information has lost. It has also been found that Word2vec sometimes cannot outperform the traditional BOW representation when weighted by TF-IDF.

Figure 4:
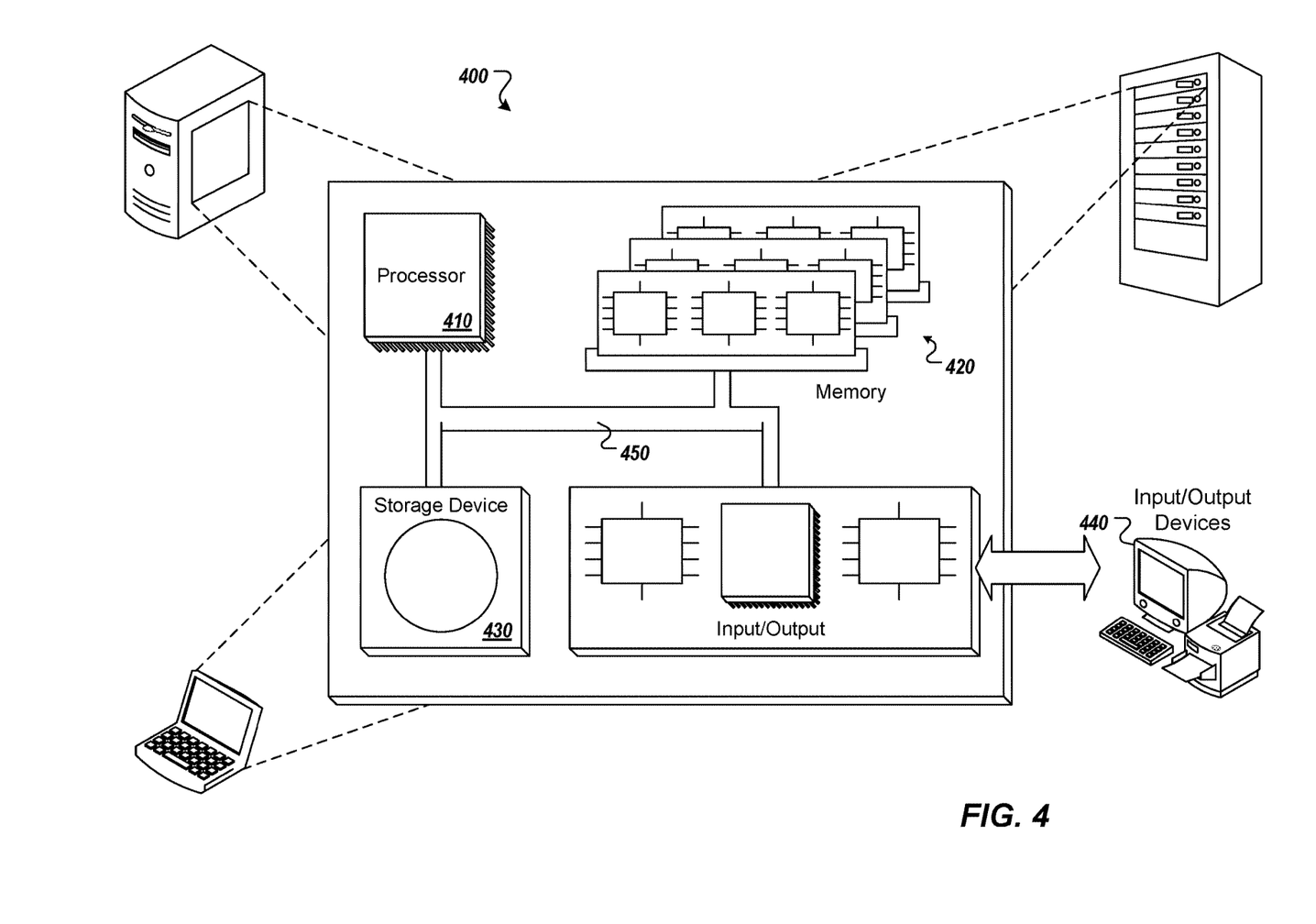
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing weighted vector representations of documents, the method being executed by one or more processors and comprising:
    receiving, by the one or more processors, text data, the text data comprising a plurality of documents, each document comprising a plurality of words;
    processing, by the one or more processors, the text data to provide a plurality of word-vectors, each word-vector being based on a respective word of the plurality of words;
    determining, by the one or more processors, a plurality of similarity scores based on the plurality of word-vectors, each similarity score representing a degree of similarity between word-vectors;
    grouping, by the one or more processors, words of the plurality of words into clusters based on the plurality of similarity scores, each cluster comprising two or more words of the plurality of words; and
    providing, by the one or more processors, a document representation for each document in the plurality of documents, each document representation comprising a feature vector, each feature in the feature vector comprising a cluster, each feature having a weight assigned thereto that represents a relative importance of a respective cluster to a respective document based on weights of constituent words in the cluster, each weight being determined based on a sum of frequency values of words in the respective cluster of the respective document and a sum of document frequency values of words in the respective cluster of the respective document across the plurality of documents.

2. The method of claim 1, wherein each feature of the document representation comprises a feature value based on the weight determined for a respective cluster.

3. The method of claim 2, wherein the weight comprises a term frequency and inverse document frequency (TF-IDF) weight.

4. The method of claim 1, wherein words are included in a cluster in response to determining that their respective word-vectors are sufficiently similar.

5. The method of claim 1, wherein each similarity score of the plurality of similarity scores is determined as a cosine similarity score between multiple word-vectors.

6. The method of claim 1, wherein processing the text data to provide a plurality of word-vectors comprises processing at least a portion of the text data using Word2vec.

7. The method of claim 1, further comprising providing the document representations to a document classification system for one or more of natural language processing (NLP) and information retrieval (IR) based on the document representations.

8. A non-transitory computer-readable storage medium coupled to one or more processors and having instructions stored thereon which, when executed by the one or more processors, cause the one or more processors to perform operations for providing weighted vector representations of documents, the operations comprising:
- receiving text data, the text data comprising a plurality of documents, each document comprising a plurality of words;
- processing the text data to provide a plurality of word-vectors, each word-vector being based on a respective word of the plurality of words;
- determining a plurality of similarity scores based on the plurality of word-vectors, each similarity score representing a degree of similarity between word-vectors;
- grouping words of the plurality of words into clusters based on the plurality of similarity scores, each cluster comprising two or more words of the plurality of words; and
- providing a document representation for each document in the plurality of documents, each feature in the feature vector comprising a cluster, each feature having a weight assigned thereto that represents a relative importance of a respective cluster to a respective document based on weights of constituent words in the cluster, each weight being determined based on a sum of frequency values of words in the respective cluster of the respective document and a sum of document frequency values of words in the respective cluster of the respective document across the plurality of documents.

9. The computer-readable storage medium of claim 8, wherein each feature of the document representation comprises a feature value based on the weight determined for a respective cluster.

10. The computer-readable storage medium of claim 9, wherein the weight comprises a term frequency and inverse document frequency (TF-IDF) weight.

11. The computer-readable storage medium of claim 8, wherein words are included in a cluster in response to determining that their respective word-vectors are sufficiently similar.

12. The computer-readable storage medium of claim 8, wherein each similarity score of the plurality of similarity scores is determined as a cosine similarity score between multiple word-vectors.

13. The computer-readable storage medium of claim 8, wherein processing the text data to provide a plurality of word-vectors comprises processing at least a portion of the text data using Word2vec.

14. The computer-readable storage medium of claim 8, wherein operations further comprise providing the document representations to a document classification system for one or more of natural language processing (NLP) and information retrieval (IR) based on the document representations.

15. A system, comprising:
- a computing device; and
- a computer-readable storage device coupled to the computing device and having instructions stored thereon which, when executed by the computing device, cause the computing device to perform operations for unsupervised aspect extraction from raw data, the operations comprising:
  - a receiving text data, the text data comprising a plurality of documents, each document comprising a plurality of words;
  - processing the text data to provide a plurality of word-vectors, each word-vector being based on a respective word of the plurality of words;
  - determining a plurality of similarity scores based on the plurality of word-vectors, each similarity score representing a degree of similarity between word-vectors;
  - grouping words of the plurality of words into clusters based on the plurality of similarity scores, each cluster comprising two or more words of the plurality of words; and
  - providing a document representation for each document in the plurality of documents, each feature in the feature vector comprising a cluster, each feature having a weight assigned thereto that represents a relative importance of a respective cluster to a respective document based on weights of constituent words in the cluster, each weight being determined based on a sum of frequency values of words in the respective cluster of the respective document and a sum of document frequency values of words in the respective cluster of the respective document across the plurality of documents.

16. The system of claim 15, wherein each feature of the document representation comprises a feature value based on the weight determined for a respective cluster.

17. The system of claim 16, wherein the weight comprises a term frequency and inverse document frequency (TF-IDF) weight.

18. The system of claim 15, wherein words are included in a cluster in response to determining that their respective word-vectors are sufficiently similar.

19. The system of claim 15, wherein each similarity score of the plurality of similarity scores is determined as a cosine similarity score between multiple word-vectors.

20. The system of claim 15, wherein processing the text data to provide a plurality of word-vectors comprises processing at least a portion of the text data using Word2vec.

* * * * *